United States Patent
Himmelmann et al.

(10) Patent No.: US 11,859,666 B2
(45) Date of Patent: Jan. 2, 2024

(54) ROTARY PHASE SEPARATOR WITH MAGNETIC BEARING

(71) Applicant: Hamilton Sundstrand Corporation, Charlotte, NC (US)

(72) Inventors: Ashley Rose Himmelmann, Beloit, WI (US); Cory Kaufman, Saint Louis, MO (US); Miguel Frazier, Houston, TX (US); Arjun Nagpal, Houston, TX (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 152 days.

(21) Appl. No.: 17/412,751

(22) Filed: Aug. 26, 2021

(65) Prior Publication Data
US 2023/0061705 A1    Mar. 2, 2023

(51) Int. Cl.
*F16C 32/04*    (2006.01)

(52) U.S. Cl.
CPC ...... *F16C 32/0442* (2013.01); *F16C 2320/42* (2013.01)

(58) Field of Classification Search
CPC ............. F16C 32/0442; F16C 2320/42; B01D 46/003; B01D 46/0056; B01D 45/14; H02K 7/09
See application file for complete search history.

(56) References Cited

U.S. PATENT DOCUMENTS

| | | | |
|---|---|---|---|
| 3,915,673 A | 10/1975 | Tamai et al. | |
| 6,063,019 A | 5/2000 | Wade | |
| 6,181,040 B1 * | 1/2001 | Schob | .................. A61M 60/113 |
| 6,592,654 B2 | 7/2003 | Brown | |
| 8,657,935 B2 | 2/2014 | Lardy et al. | |
| 2003/0000184 A1 | 1/2003 | Dean | |
| 2012/0151887 A1 | 6/2012 | Dorao et al. | |
| 2013/0294939 A1 * | 11/2013 | Gilarranz | .................. H02K 7/14 |
| 2015/0104290 A1 | 4/2015 | Dickson et al. | |

FOREIGN PATENT DOCUMENTS

| | | | | |
|---|---|---|---|---|
| WO | 2012057885 A1 | 5/2012 | | |
| WO | WO-2019002663 A1 * | 1/2019 | .......... | F16C 32/0406 |
| WO | WO-2020103520 A1 * | 5/2020 | .......... | F04D 25/0606 |

OTHER PUBLICATIONS

European Search Report for European Application No. 22189515.4; dated Dec. 23, 2022; 83 pages.

* cited by examiner

*Primary Examiner* — Tulsidas C Patel
*Assistant Examiner* — Mohammed Ahmed Qureshi
(74) *Attorney, Agent, or Firm* — CANTOR COLBURN LLP

(57) ABSTRACT

A rotary phase separator for a space environment includes a housing defining a separator chamber therein and a shaft located along a longitudinal axis of the rotary phase separator and inside the housing. Relative motion between the housing and the shaft about the longitudinal axis urging separation of gas and liquid from a two-phase liquid and gas fluid in the separator chamber. One or more magnetic bearing assemblies are supportive of the shaft relative to the housing.

17 Claims, 3 Drawing Sheets

ROTARY PHASE SEPARATOR WITH MAGNETIC BEARING

BACKGROUND

Exemplary embodiments pertain to the art of space vehicles and habitats, and, in particular, to phase separators of space vehicles and space habitats.

The shift towards deep-space, long-duration missions, and the increase in commercialization of space travel motivate the need for technology useful for such long-duration travel. Space applications require accommodating a wide variety of flow compositions, minimizing or eliminating leakage, running at a wide and varying range of speeds, maximizing design life with minimal maintenance, and other unique challenges that the current commercial rotary phase separators cannot meet.

BRIEF DESCRIPTION

In one embodiment, a rotary phase separator for a space environment includes a housing defining a separator chamber therein and a shaft located along a longitudinal axis of the rotary phase separator and inside the housing. Relative motion between the housing and the shaft about the longitudinal axis urging separation of gas and liquid from a two-phase liquid and gas fluid in the separator chamber. One or more magnetic bearing assemblies are supportive of the shaft relative to the housing.

Additionally or alternatively, in this or other embodiments a plurality of discs are positioned along the shaft and are rotatable about the longitudinal axis with the shaft. The plurality of discs are configured to urge separation of the gas and liquid from the two-phase liquid and gas fluid in the separator chamber Additionally or alternatively, in this or other embodiments the one or more magnetic bearing assemblies includes at least one radial bearing assembly and an axial bearing assembly.

Additionally or alternatively, in this or other embodiments the at least one radial bearing assembly is two radial bearing assemblies.

Additionally or alternatively, in this or other embodiments each radial bearing assembly includes a radial bearing rotor located at the shaft, and a radial bearing stator located at the housing.

Additionally or alternatively, in this or other embodiments the radial bearing stator is located outside of the housing.

Additionally or alternatively, in this or other embodiments a first radial bearing assembly of the at least one radial bearing assembly is located at a first shaft end and a second radial bearing assembly of the at least one radial bearing assembly is located at a second shaft end opposite the first shaft end.

Additionally or alternatively, in this or other embodiments the axial bearing assembly includes an axial bearing rotor element located at the shaft, and a plurality of axial bearing stator elements located upstream and downstream of the axial bearing rotor element, relative to the longitudinal axis.

Additionally or alternatively, in this or other embodiments the plurality of axial bearing stator elements is located outside of the housing.

Additionally or alternatively, in this or other embodiments the one or more magnetic bearings are actively controlled by a bearing controller.

Additionally or alternatively, in this or other embodiments the shaft is driven by a motor located in the housing.

In another embodiment, a rotary phase separator includes a housing defining a separator chamber therein, and a shaft located at a longitudinal axis of the rotary phase separator and rotatable about the longitudinal axis. A plurality of discs are positioned along the shaft and are rotatable about the longitudinal axis with the shaft. The plurality of discs are configured to urge separation of gas and liquid from a two-phase liquid and gas fluid in the separator chamber. One or more magnetic bearing assemblies are supportive of the shaft. Each magnetic bearing assembly includes a bearing rotor element, and a bearing stator element magnetically interactive with the bearing rotor element to support the shaft. The bearing rotor element is located in the housing and the bearing stator element is located outside of the housing.

Additionally or alternatively, in this or other embodiments the one or more magnetic bearing assemblies includes at least one radial bearing assembly and an axial bearing assembly.

Additionally or alternatively, in this or other embodiments the at least one radial bearing assembly is two radial bearing assemblies.

Additionally or alternatively, in this or other embodiments a first radial bearing assembly of the at least one radial bearing assembly is located at a first shaft end and a second radial bearing assembly of the at least one radial bearing assembly is located at a second shaft end opposite the first shaft end.

Additionally or alternatively, in this or other embodiments the axial bearing assembly includes an axial bearing rotor element located at the shaft, and a plurality of axial bearing stator elements located upstream and downstream of the axial bearing rotor element, relative to the longitudinal axis.

Additionally or alternatively, in this or other embodiments the one or more magnetic bearings are actively controlled by a bearing controller.

Additionally or alternatively, in this or other embodiments the shaft is driven by a motor located in the housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The present disclosure incorporates magnetic bearings as one or all of the bearing elements in a rotary separator. The term magnetic bearing includes actively controlled or passive magnetic bearings. The magnetic bearings in these configurations may also be canned, which allows for the ability to hermetically seal the separator. Magnetic bearing rotary phase separators minimize wear, improve external load performance, reduce maintenance, extend life, remove the need for lubricant, accommodate a wide range of running speeds, and allow for easily measured and readily changed dynamic properties. They can also be used in harsh environmental conditions, including extremely low temperatures, zero-gravity, and corrosive environments.

Figure 1:
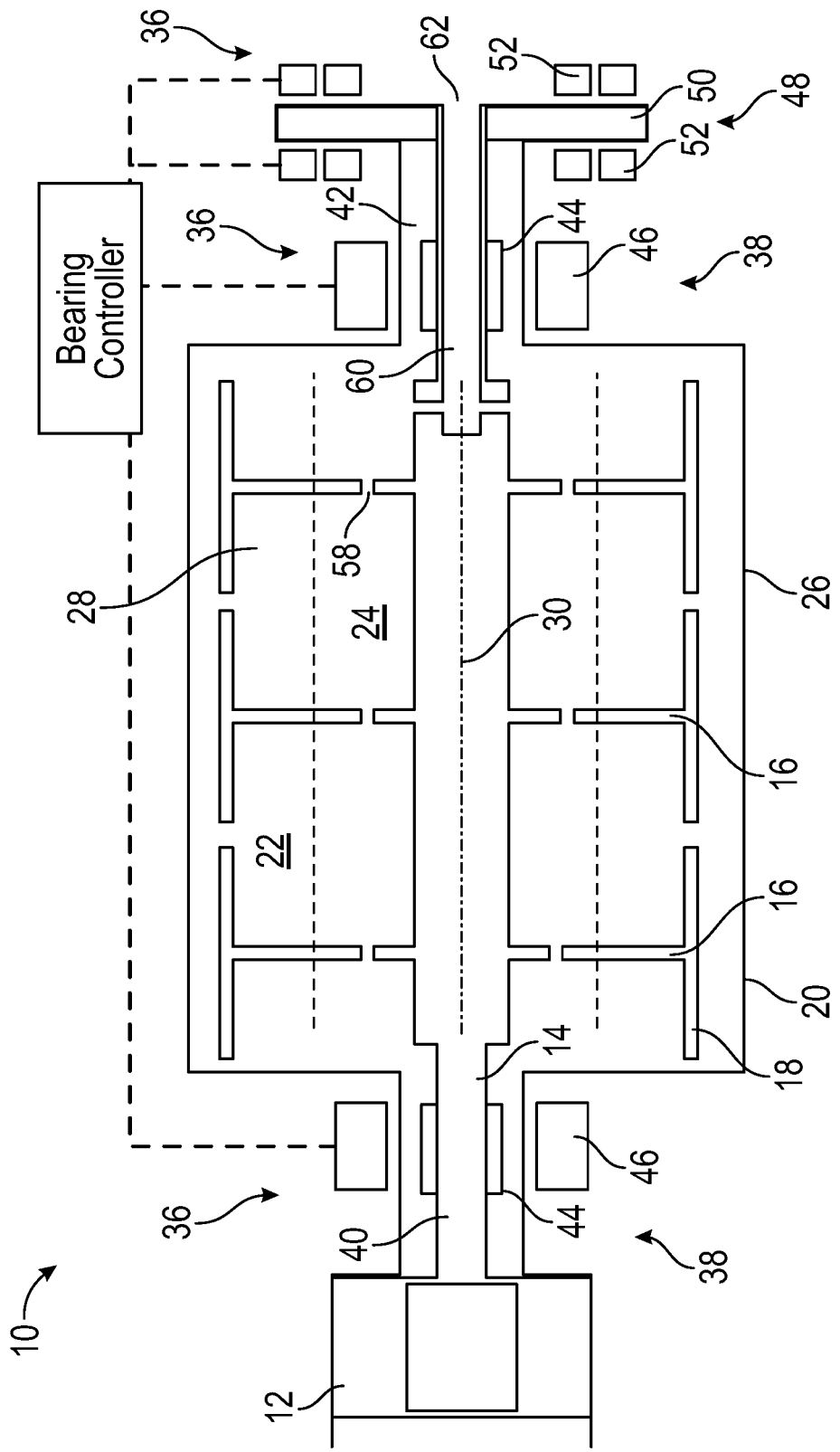
FIG. 1 is a cross-sectional view of an embodiment of a magnetic bearing rotary phase separator.

Referring to the Figures, a cross-sectional view of an embodiment of a magnetic bearing rotary phase separator 10 is shown in FIG. 1. The rotary phase separator 10 separates phases of the liquid/gas mixture by using a motor 12 to drive a shaft 14 having a plurality of disks 16 and cylinders 18 that contact the liquid/gas mixture to spin the liquid such that centrifugal force drives the liquid toward an outer diameter 20 thereby creating a liquid ring 22 that displaces gas. The gas then migrates toward the center to create a gas core 24. The liquid and gas are then exhausted from the chamber through separate outlet ports.

The rotary phase separator 10 includes a housing 26 that defines a separator chamber 28 inside of the housing 26. In some embodiments, the separator chamber 28 is cylindrical with the outer diameter 20 concentric about a longitudinal axis 30 of the housing 26. The housing 26 includes an inlet opening 32, shown in the end view of FIG. 2, tangential to an outer diameter of a pre-swirl chamber 34, also shown in FIG. 2.

The motor 12 is mounted to the housing 26 and drives the shaft 14 about the longitudinal axis 30. In some embodiments, the motor 12 is a canned electric motor. One skilled in the art will readily appreciate that a canned electric motor 12 is only one possible means of rotating the shaft 14. The shaft 14 may be driven by alternate methods, such as being driven by a hydraulic pump or other adjacent apparatus. While in the embodiment illustrated in FIG. 1, the housing 26 is stationary and the shaft 14 rotates about the longitudinal axis 30, in other embodiments the configuration is reversed and the shaft 14 is stationary while the housing 26 rotates about the longitudinal axis 30.

Figure 3:
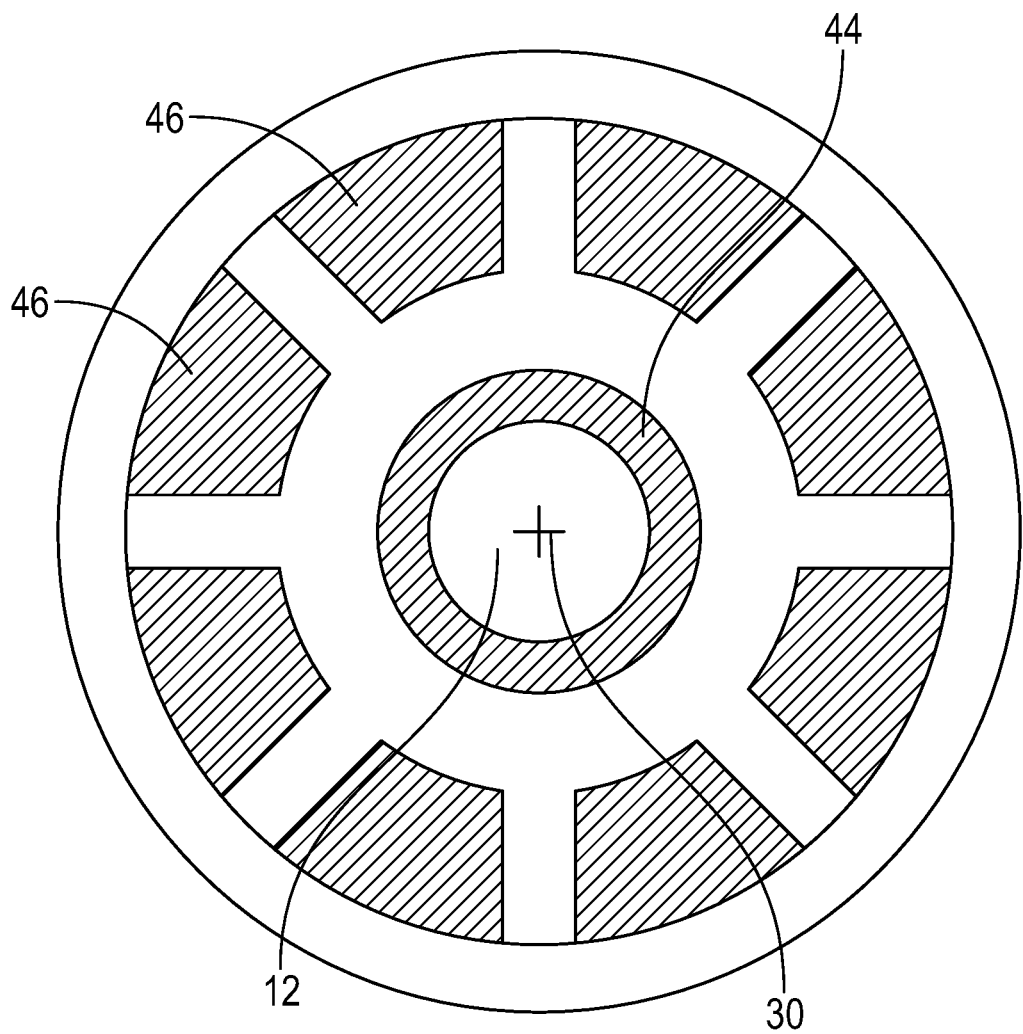
FIG. 3 is a cross-sectional view of an embodiment of a radial bearing assembly.

Bearing assemblies 36 support the shaft 14 for rotation about the longitudinal axis 30. The bearing assemblies 36 are magnetic bearings. Magnetic bearings utilize magnetic levitation to support the shaft 14 without physical contact. The bearing assemblies 36 include radial bearings 38 located at a first shaft end 40 and at a second shaft end 42 to maintain a desired radial position of the shaft 14 relative to the longitudinal axis 30. The radial bearings 38 include a radial bearing rotor 44 disposed at the shaft 14 and rotatable with the shaft 14, and an electromagnetic bearing stator 46 disposed at the housing 26, such that when the bearing stator 46 is electrically energized, the shaft 14 is levitated to its operational radial position, such as shown in FIG. 1 and in a cross-sectional view of a bearing assembly as shown in FIG. 3. In some embodiments, the motor 12 and the radial bearing rotor 44 are located inside the housing 26, while the radial bearing stator 46 is located outside of the housing 26. While two radial bearings 38 are illustrated in FIG. 1, it is to be appreciated that other quantities of radial bearings 38, such as three or more radial bearings 38, may be utilized.

The bearing assemblies 36 further include an axial bearing 48 configured to maintain a desired axial position of the shaft 14 relative to the housing 26. In some embodiments, the axial bearing 48 is located at the second shaft end 42 such as shown in FIG. 1, but one skilled in the art will readily appreciate that the axial bearing 48 may be located at other positions along the shaft 14. The axial bearing 48 includes axial bearing rotor elements 50 located at the shaft 14 and rotatable with the shaft 14. Axial bearing stator elements 52 are located upstream of the axial bearing rotor elements 50 and downstream of the axial bearing rotor elements 50, relative to the longitudinal axis 30. When electrically energized, the shaft 14 is maintained operational axial position along the longitudinal axis 30, such as shown in FIG. 1. In some embodiments, the axial bearing rotor elements 50 are located inside the housing 26, while the axial bearing stator elements 52 are located outside of the housing 26.

Locating the radial bearing stator 46 and the axial bearing stator elements 52 outside of the housing 26, while the motor 12, the radial bearing rotor 44 and the axial bearing rotor elements 50 are located inside the housing 26 allows for the motor 12 and the bearing assemblies 36 to be "canned" or sealed, reducing leakage from the separator 10 or isolation of hazardous fluids internal to the separator 10.

In some embodiments, such as shown in FIG. 1, the bearing assemblies 36 are actively controlled and connected to a bearing controller 54. The bearing controller 54 may utilize, for example, position sensor data, to selectably alter the electrical signal to the radial bearing stator 46 and/or the axial bearing stator elements 52 to modify a radial and/or axial position of the shaft 14 during operation of the separator 10.

Figure 2:
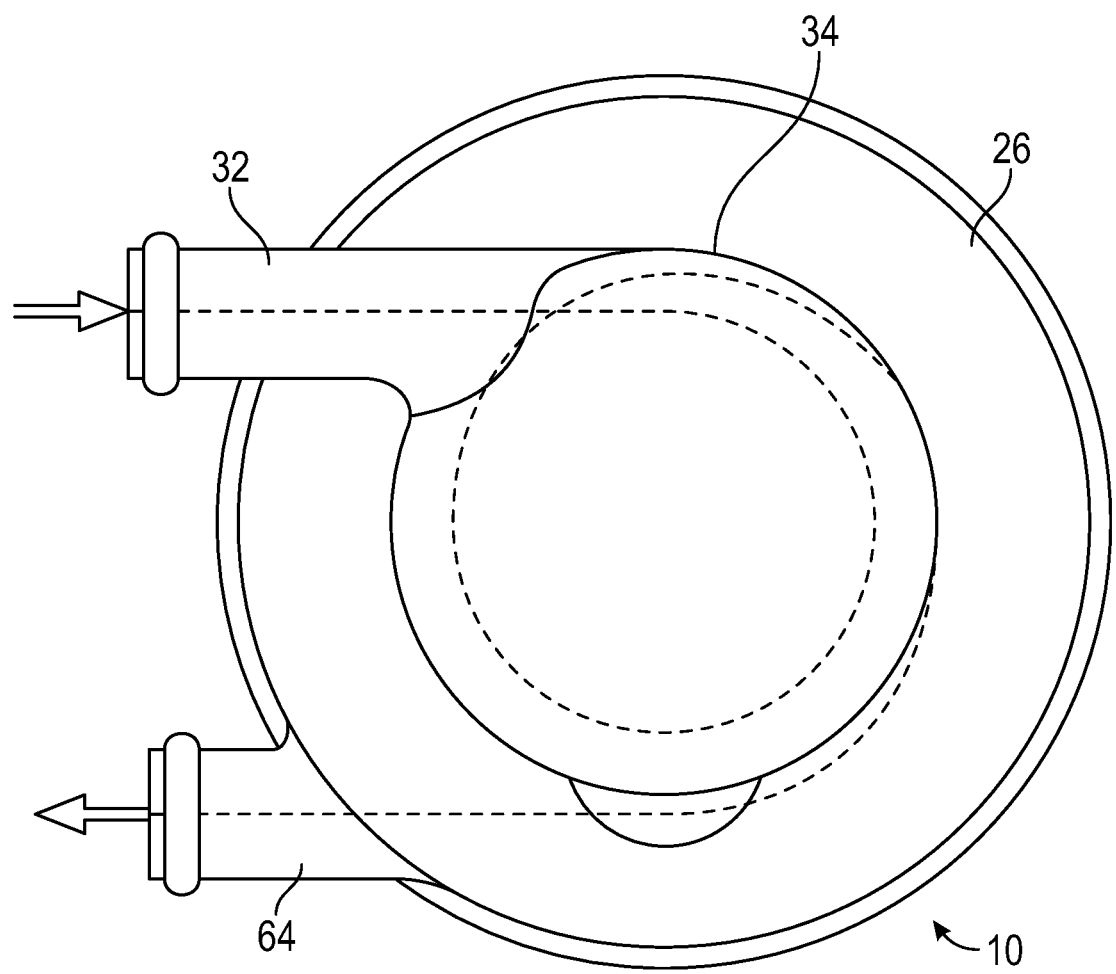
FIG. 2 is an end view of an embodiment of a magnetic bearing rotary phase separator.

In operation, the liquid/gas mixture enters the separator chamber 28 through the inlet opening 32 in a tangential manner, best shown in FIG. 2. The liquid/gas mixture then enters the separator chamber 28 and flows past the disks 16 of the plurality of disks 16 axially along the separator chamber 28.

The motor 12 rotates the shaft 14 and thereby the disks 16 about the longitudinal axis 30 mixture. As the liquid/gas mixture flows around the disks 16 the gas is displaced by the liquid and thereby moves toward the longitudinal axis 30 to form the gas core 24. The liquid moves toward the outer diameter 20 of the separator chamber 28 to form the liquid ring 22. The rotation of the disks 16 and cylinders 18 maintains the incoming rotation of the liquid portion of the mixture along the outer diameter 20 of the separator chamber 28. Rotation of the disks 16 and cylinders 18 generates a centrifugal force that drives the liquid toward the outer diameter 20 of the separator chamber 28 away from the longitudinal axis 30. The gas core 24 forms because the heavier liquid displaces the lighter gas to form the gas core 24 within the liquid ring 22. Gas flows through openings 58 in the disks 16 and may exit the separator chamber 28 via, for example, a hollow shaft portion 60 of the shaft 14 and out of a gas outlet 62. Liquid from the liquid ring exits the separator chamber 28 via a liquid outlet 64 (shown in FIG. 2).

The incorporation of magnetic bearing assemblies 36 as one or more of the bearing assemblies 36 of the rotary separator 10 allows for the separator chamber 28 to be hermetically sealed. Further, the use of magnetic bearing assemblies 36 results in minimal friction and wear from the load bearing elements of the bearing assemblies 36, and improved performance of the bearing assemblies 36 while experiencing external loads, such as launch loads. Additionally or alternatively, the use of magnetic bearing assemblies 36 reduce vibration emissions and maintenance required as well as extends the service life of the rotary separator 10 and removes the need for lubrication of bearing assemblies. Magnetic bearing assemblies 36 can be used in harsh environmental conditions, including extremely low temperatures, low pressures, micro gravity conditions, and corrosive environments. A wide range of running speeds may be used, including ultra high speed rotation.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary phase separator for a space environment, comprising:
   a housing defining a separator chamber therein;
   a shaft disposed along a longitudinal axis of the rotary phase separator inside of the housing, relative motion between the housing and the shaft about the longitudinal axis urging separation of gas and liquid from a two-phase liquid and gas fluid in the separator chamber; and
   one or more magnetic bearing assemblies supportive of the shaft relative to the housing; and
   a plurality of discs positioned along the shaft and rotatable about the longitudinal axis with the shaft, the plurality of discs disposed in the separation chamber and configured to urge separation of the gas and liquid from the two-phase liquid and gas fluid in the separator chamber.

2. The rotary phase separator of claim 1, wherein the one or more magnetic bearing assemblies includes at least one radial bearing assembly and an axial bearing assembly.

3. The rotary phase separator of claim 2, wherein the at least one radial bearing assembly is two radial bearing assemblies.

4. The rotary phase separator of claim 2, wherein each radial bearing assembly includes:
   a radial bearing rotor disposed at the shaft; and
   a radial bearing stator disposed at the housing.

5. The rotary phase separator of claim 4, wherein the radial bearing stator is disposed outside of the housing.

6. The rotary phase separator of claim 2, wherein a first radial bearing assembly of the at least one radial bearing assembly is disposed at a first shaft end and a second radial bearing assembly of the at least one radial bearing assembly is disposed at a second shaft end opposite the first shaft end.

7. The rotary phase separator of claim 2, wherein the axial bearing assembly includes:
   an axial bearing rotor element disposed at the shaft; and
   a plurality of axial bearing stator elements disposed upstream and downstream of the axial bearing rotor element, relative to the longitudinal axis.

8. The rotary phase separator of claim 7, wherein the plurality of axial bearing stator elements is disposed outside of the housing.

9. The rotary phase separator of claim 1, wherein the one or more magnetic bearings are actively controlled by a bearing controller.

10. The rotary phase separator of claim 1, wherein the shaft is driven by a motor disposed in the housing.

11. A rotary phase separator, comprising:
    a housing defining a separator chamber therein;
    a shaft disposed at a longitudinal axis of the rotary phase separator and rotatable about the longitudinal axis;
    a plurality of discs positioned along the shaft and rotatable about the longitudinal axis with the shaft, the plurality of discs disposed in the separation chamber and configured to urge separation of gas and liquid from a two-phase liquid and gas fluid in the separator chamber; and
    one or more magnetic bearing assemblies supportive of the shaft, each magnetic bearing assembly including
    a bearing rotor element; and
    a bearing stator element magnetically interactive with the bearing rotor element to support the shaft;
    wherein the bearing rotor element is disposed in the housing and the bearing stator element is disposed outside of the housing.

12. The rotary phase separator of claim 11, wherein the one or more magnetic bearing assemblies includes at least one radial bearing assembly and an axial bearing assembly.

13. The rotary phase separator of claim 12, wherein the at least one radial bearing assembly is two radial bearing assemblies.

14. The rotary phase separator of claim 12, wherein a first radial bearing assembly of the at least one radial bearing assembly is disposed at a first shaft end and a second radial bearing assembly of the at least one radial bearing assembly is disposed at a second shaft end opposite the first shaft end.

15. The rotary phase separator of claim 12, wherein the axial bearing assembly includes:
    an axial bearing rotor element disposed at the shaft; and
    a plurality of axial bearing stator elements disposed upstream and downstream of the axial bearing rotor element, relative to the longitudinal axis.

16. The rotary phase separator of claim 11, wherein the one or more magnetic bearings are actively controlled by a bearing controller.

17. The rotary phase separator of claim 11, wherein the shaft is driven by a motor disposed in the housing.

* * * * *